(12) United States Patent  
Cherian et al.

(10) Patent No.: US 8,539,180 B2
(45) Date of Patent: *Sep. 17, 2013

(54) SYSTEM AND METHOD FOR MIGRATION OF DATA

(75) Inventors: Jacob Cherian, Austin, TX (US); Gaurav Chawla, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/348,370

(22) Filed: Jan. 11, 2012

(65) Prior Publication Data

US 2012/0110593 A1  May 3, 2012

Related U.S. Application Data

(63) Continuation of application No. 12/435,892, filed on May 5, 2009, now Pat. No. 8,122,213.

(51) Int. Cl.
*G06F 13/00* (2006.01)

(52) U.S. Cl.
USPC ............................ 711/162; 711/165; 718/104

(58) Field of Classification Search
USPC ................ 711/162, 165, 114, 170, 161, 118, 711/136, 137, 160, 216
See application file for complete search history.

(56) References Cited

U.S. PATENT DOCUMENTS

| 2,006,003 | A | 6/1935 | Schoeller et al. | 536/121 |
| 7,124,143 | B2 | 10/2006 | Matsunami et al. | 707/101 |
| 7,330,948 | B2 * | 2/2008 | Deguchi et al. | 711/162 |
| 8,122,213 | B2 * | 2/2012 | Cherian et al. | 711/162 |
| 2004/0146045 | A1 | 7/2004 | Jimmei et al. | 370/351 |
| 2007/0043703 | A1 * | 2/2007 | Bhattacharya et al. | 707/3 |
| 2008/0059745 | A1 | 3/2008 | Tsukada et al. | 711/165 |
| 2008/0130661 | A1 * | 6/2008 | Jiang et al. | 370/401 |
| 2010/0235592 | A1 * | 9/2010 | Kaneda et al. | 711/161 |

* cited by examiner

*Primary Examiner* — Dang Nguyen
(74) *Attorney, Agent, or Firm* — Baker Botts L.L.P.

(57) ABSTRACT

Systems and methods for data migration are disclosed. A method may include allocating a destination storage resource to receive migration data. The method may also include assigning the destination storage resource a first identifier value equal to an identifier value associated with a source storage resource. The method may additionally include assigning the source storage resource a second identifier value different than the first identifier value. The method may further include migrating data from the source storage resource to the destination storage resource.

16 Claims, 4 Drawing Sheets

SYSTEM AND METHOD FOR MIGRATION OF DATA

RELATED APPLICATIONS

This application is a continuation of U.S. patent application Ser. No. 12/435,892 filed May 5, 2009, now U.S. Pat. No. 8,122,213 the contents of which is incorporated herein in its entirety by this reference.

TECHNICAL FIELD

The present disclosure relates in general to storage and processing of data, and more particularly to migrating stored data from one storage resource to another.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use one or more arrays of physical storage resources, for storing information. Arrays of physical storage resources typically utilize multiple disks to perform input and output operations and can be structured to provide redundancy which may increase fault tolerance (e.g., a Redundant Array of Independent Disks or "RAID"). Other advantages of arrays of storage resources may be increased data integrity, throughput, and/or capacity. In operation, one or more physical storage resources disposed in an array of storage resources may appear to an operating system as a single logical storage unit or "virtual storage resource." Implementations of storage resource arrays can range from a few storage resources disposed in a server chassis, to hundreds of storage resources disposed in one or more separate storage enclosures. In certain cases, one or more arrays of storage resources may be implemented as a storage area network (SAN). A SAN is in effect an array or collection of physical storage resources communicatively coupled to and accessible via a network (e.g., a host information handling system may access the SAN via a network connection).

From time to time, an administrator or user of an array of storage resources may desire to migrate data from one storage resource to another. For example, as a storage resource ages and becomes obsolete, it may be desired to copy all of the data from the storage resource to a newer storage resource. However, traditional approaches to data migration have numerous disadvantages. For example, FIG. 1 depicts a system 100 employing a traditional approach to data migration. In the approach depicted in FIG. 1, a migration module 104 on host 102 may manage migration of data from storage resource 110a of storage array 108a to storage array 108b. Under this approach, capacity is allocated to the destination storage array 108b (e.g., storage resource 110b is allocated to storage array 108b), and destination storage resource 110b is assigned an identifier (e.g., iSCSI qualified name or Fibre Channel World Wide Name) different than that of the source storage resource 110a. Migration module 104 then reads the data from source storage resource 110a and writes it to destination storage resource 110b such that migrated data follows path 116. During migration, a portion of the data being migrated may be the target of an input-output (I/O) operation (e.g., a read request or write request from host 102). Accordingly, under the approach of FIG. 1, data associated with write requests may be written to both source storage resource 110a and destination storage resource 110b, and the migration module 104 may track which blocks have been written, so as to avoid writing old data over new data during the migration. Data associated with read requests during migration may be read from source storage resource 110a. After all migrated data is copied to destination storage resource 110b, migration module 104 may reconfigure host 102 to map to the destination storage resource 110b, and source storage resource 110a may be deleted.

The approach of FIG. 1 has numerous disadvantages. For example, the approach of FIG. 1 is inefficient because migrated data moves over network 106 twice (first from source storage resource 110a to host 102, then from host 102 to destination storage resource 110b). In addition, the approach of FIG. 1 requires that data associated with write requests be written to both source storage resource 110a and destination storage resource 110b during migration. Furthermore, this approach comes with a high level of management complexity, as destination storage resource 110b is assigned a new identifier, requiring reconfiguration at the host level, network level, and the storage array level.

As another example, FIG. 2 depicts a system 200 employing a traditional approach to data migration. In the approach depicted in FIG. 2, a replication module 214 on storage array 208a may manage migration of data from storage resource 210a of storage array 208a to storage array 208b. Under this approach, capacity is allocated to the destination storage array 208b (e.g., storage resource 210b is allocated to storage array 208b), and destination storage resource 210b is assigned an identifier (e.g., iSCSI qualified name or Fibre Channel World Wide Name) different than that of the source storage resource 210a. Replication module 214 then reads the data from source storage resource 210a and writes it to destination storage resource 210b via network 206 such that migrated data follows path 216. Replication module 214 may use periodic snapshot technology to take periodic point in time snapshots to allow it to maintain a consistent copy of data for migration and allow it to track writes to source storage resource 210a during migration of data to destination storage resource 210b. Accordingly, under the approach of FIG. 2, data associated with write requests may be tracked using the snapshot technology. Initially, data written by host 102 during migration may be written to source storage resource 210a if blocks associated with such data have not been migrated, and may replication module 314 may also track writes using snapshot technology. At a certain point (e.g., if the number of blocks written by host 102 becomes small), replication module 214 may block I/O commands from host 102, complete data migrations, and then reconfigure host 102 to access the new storage resource 110b.

The approach of FIG. 2 also has numerous disadvantages. For example, the approach of FIG. 2 is inefficient because all write requests must be tracked with snapshots, which may be quite voluminous during times of heavy write activity. In addition, this approach comes with a high level of management complexity, as destination storage resource 210b is assigned a new identifier, requiring reconfiguration at the host level and the storage array level.

SUMMARY

In accordance with the teachings of the present disclosure, the disadvantages and problems associated with data migration have been substantially reduced or eliminated.

In accordance with an embodiment of the present disclosure, a method for migration of data is provided. The method may include allocating a destination storage resource to receive migration data. The method may also include assigning the destination storage resource a first identifier value equal to an identifier value associated with a source storage resource. The method may additionally include assigning the source storage resource a second identifier value different than the first identifier value. The method may further include migrating data from the source storage resource to the destination storage resource.

In accordance with another embodiment of the present disclosure, a system for migration of data, may include a source storage resource, a destination storage resource, and a migration module configured to manage migration of data from the source storage resource to the destination storage resource. The migration module may be operable to, in response to a request to migrate data: (i) assign the destination storage resource a first identifier value equal to an identifier value associated with the source storage resource; (ii) assign the source storage resource a second identifier value different than the first identifier value; and (iii) migrate data from the source storage resource to the destination storage resource.

In accordance with a further embodiment of the present disclosure, a system for migration of data may include a source storage array comprising a source storage resource and a destination storage array. The destination storage array may be configured to: (i) allocate a destination storage resource to receive migration data from the source storage resource; (ii) assign the destination storage resource a first identifier value equal to an identifier value associated with the source storage resource; (iii) assign the source storage resource a second identifier value different than the first identifier value; and (iv) migrate data from the source storage resource to the destination storage resource.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
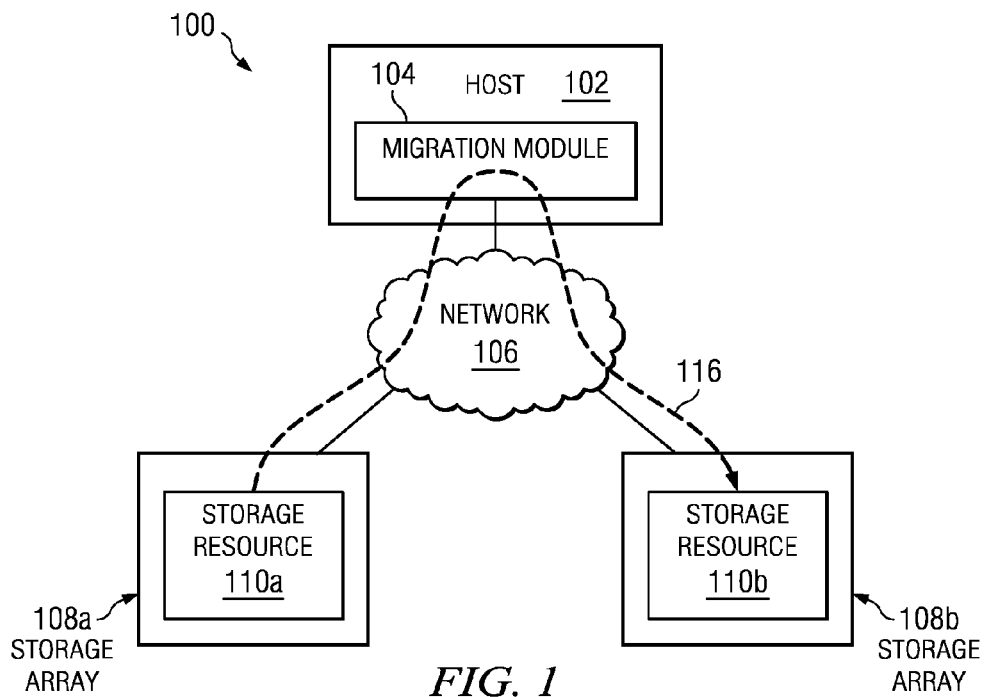
FIG. 1 illustrates a block diagram of an approach to data migration, as is known in the art.
Figure 2:
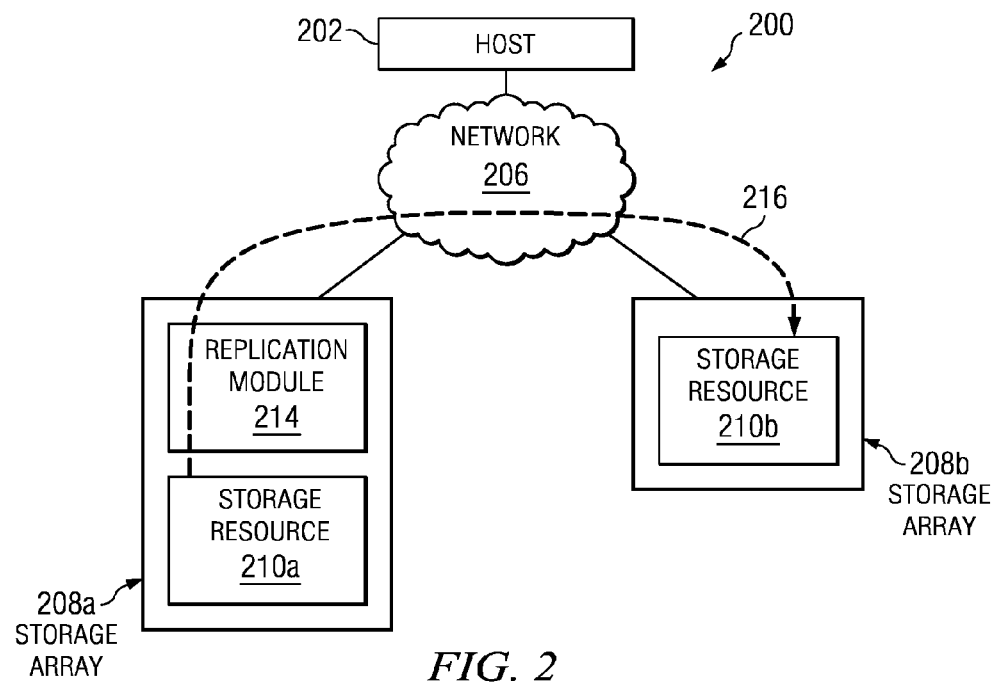
FIG. 2 illustrates a block diagram of another approach to data migration, as is known in the art.

Preferred embodiments and their advantages are best understood by reference to FIGS. 3-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, a processor may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data.

For the purposes of this disclosure, a memory may include any system, device, or apparatus configured to retain program instructions and/or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power the memory is turned off.

For the purposes of this disclosure, a network interface may include any suitable system, apparatus, or device operable to serve as an interface between an information handling system and a network using any suitable transmission protocol and/or standard.

An information handling system may include or may be coupled via a network to one or more arrays of physical storage resources. An array of physical storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "virtual storage resource."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

Figure 3:
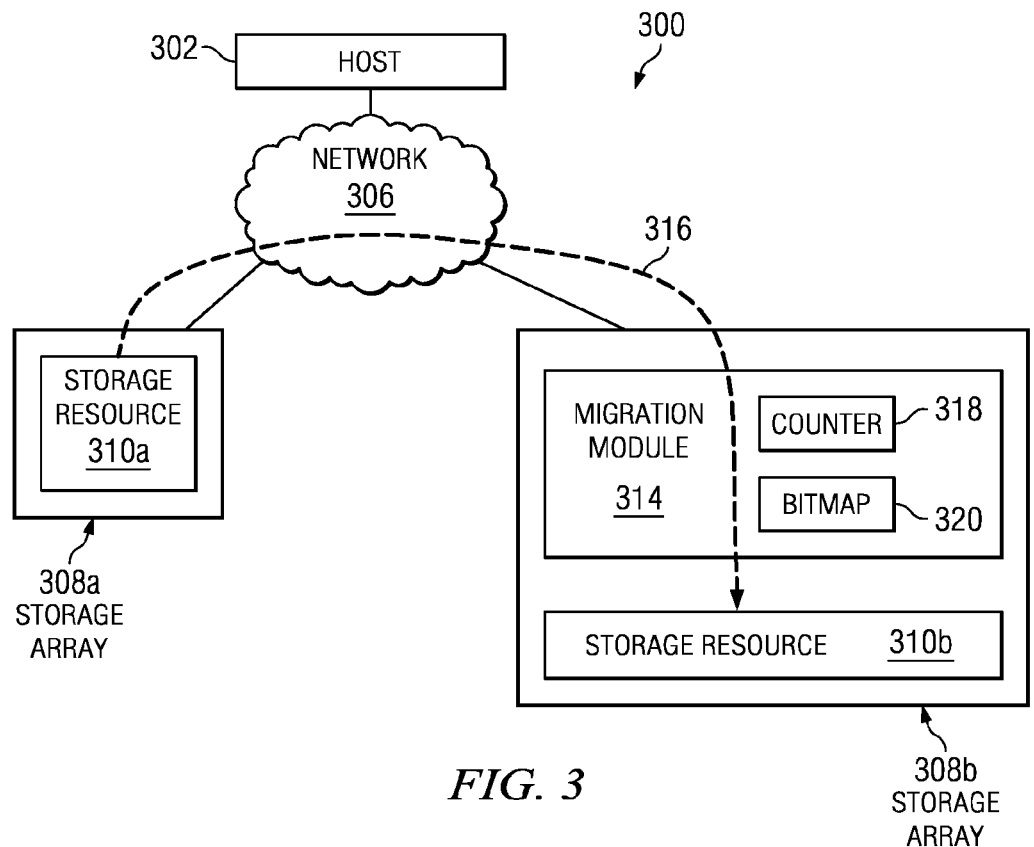
FIG. 3 illustrates a block diagram of an example system for migrating data, in accordance with certain embodiments of the present disclosure.

FIG. 3 illustrates a block diagram of an example system 300 for migrating data, in accordance with certain embodiments of the present disclosure. As depicted, system 300 may include one or more hosts 302, a network 306, and one or more storage arrays 308 each comprising one or more storage resources 310.

Host 302 may comprise an information handling system and may generally be operable to communicate via network 306 to read data from and/or write data to one or more storage resources 310 of storage arrays 308. In certain embodiments, host 302 may be a server. In another embodiment, host 302 may be a personal computer (e.g., a desktop computer or a portable computer). Host 302 may include any suitable components (e.g., one or more processors, one or more memories, and one or more network interfaces to communicatively couple host 302 to network 306. Although system 300 is depicted as having one host 302 for purposes of exposition, it is understood that system 300 may include any number of hosts 302.

Network 306 may be a network and/or fabric configured to couple host 302 to one or more of storage arrays 308. In certain embodiments, network 306 may allow host 302 to communicatively couple to storage resources 310 such that the storage resources 310 appear to host 302 as locally attached storage resources. In the same or alternative embodiments, network 306 may include a communication infrastructure, which provides physical connections, and a management layer, which organizes the physical connections, storage resources 310, and host 302. In the same or alternative embodiments, network 306 may allow block I/O services and/or file access services to storage resources 310. Network 306 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 306 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 306 and its various components may be implemented using hardware, software, or any combination thereof.

Each storage array 308 may include any collection or array of storage resources 310. Storage resources 310 may include hard disk drives, magnetic tape libraries, optical disk drives, magneto-optical disk drives, compact disk drives, compact disk arrays, disk array controllers, and/or any other system, apparatus or device operable to store data. In some embodiments, one or more of storage resources 310 may comprise a physical storage resource. In the same or alternative embodiments, one or more of storage resources 310 may comprise a virtual storage resource, wherein such virtual storage resource includes a collection of one or more physical storage resources that may appear to host 302 as a single storage resource. Although not depicted in FIG. 3, storage enclosures may be configured to hold and power one or more storage resources 310, and may be communicatively coupled to host 302 and/or network 306, in order to facilitate communication of data between host 302 and storage resources 310. In certain embodiments, one or more storage arrays 310 may be coterminous with a storage enclosure.

As depicted in FIG. 3, storage array 308b may include a migration module 314. Migration module 314 may include any system, device, or apparatus configured to manage migration of data between storage resources 310 in accordance with this disclosure and as described in greater detail elsewhere in this disclosure. In certain embodiments, all or a portion of migration module 314 may be implemented in hardware. In the same or alternative embodiments, all or a portion of migration module 314 may be implemented in software and/or firmware embodied in a computer-readable medium.

Also as shown in FIG. 3, migration module 314 may include a counter 318 and a bitmap 320. Counter 318 may include any system, device, or apparatus configured to track the amount of data migrated from one storage resource 310 to another storage resource 310 (e.g., from storage resource 310a to storage resource 310b) in accordance with this disclosure and as described in greater detail elsewhere in this disclosure. In certain embodiments, all or a portion of counter 318 may be implemented in hardware. In the same or alternative embodiments, all or a portion of counter 318 may be implemented in software and/or firmware embodied in a computer-readable medium.

Bitmap 320 may include any system, device, or apparatus configured to track the blocks of a storage resource 310 written to pursuant to an input-output operation during migration (e.g., a write request from host 302 to a destination storage resource 310 during migration) in accordance with this disclosure and as described in greater detail elsewhere in this disclosure. In certain embodiments, all or a portion of bitmap 320 may be implemented in hardware. In the same or alternative embodiments, all or a portion of bitmap 320 may be implemented in software and/or firmware embodied in a computer-readable medium.

Although the embodiment shown in FIG. 3 depicts system 300 having two storage arrays 308 for the purposes of exposition, system 300 may have any suitable number of storage arrays 308. In addition, although the embodiment shown in FIG. 3 depicts each storage array 308 having one storage resource 310 for the purposes of exposition, each storage array 308 of network 300 may have any suitable number of storage resources 310.

Although FIG. 3 depicts host 302 communicatively coupled to storage arrays 308 via network 306 for purposes of exposition, one or more hosts 302 may be communicatively coupled to one or more storage resources 310 without network 306 or other network. For example, in certain embodiments, one or more storage resources 310 may be directly coupled and/or locally attached to one or more hosts 302.

Figure 4:
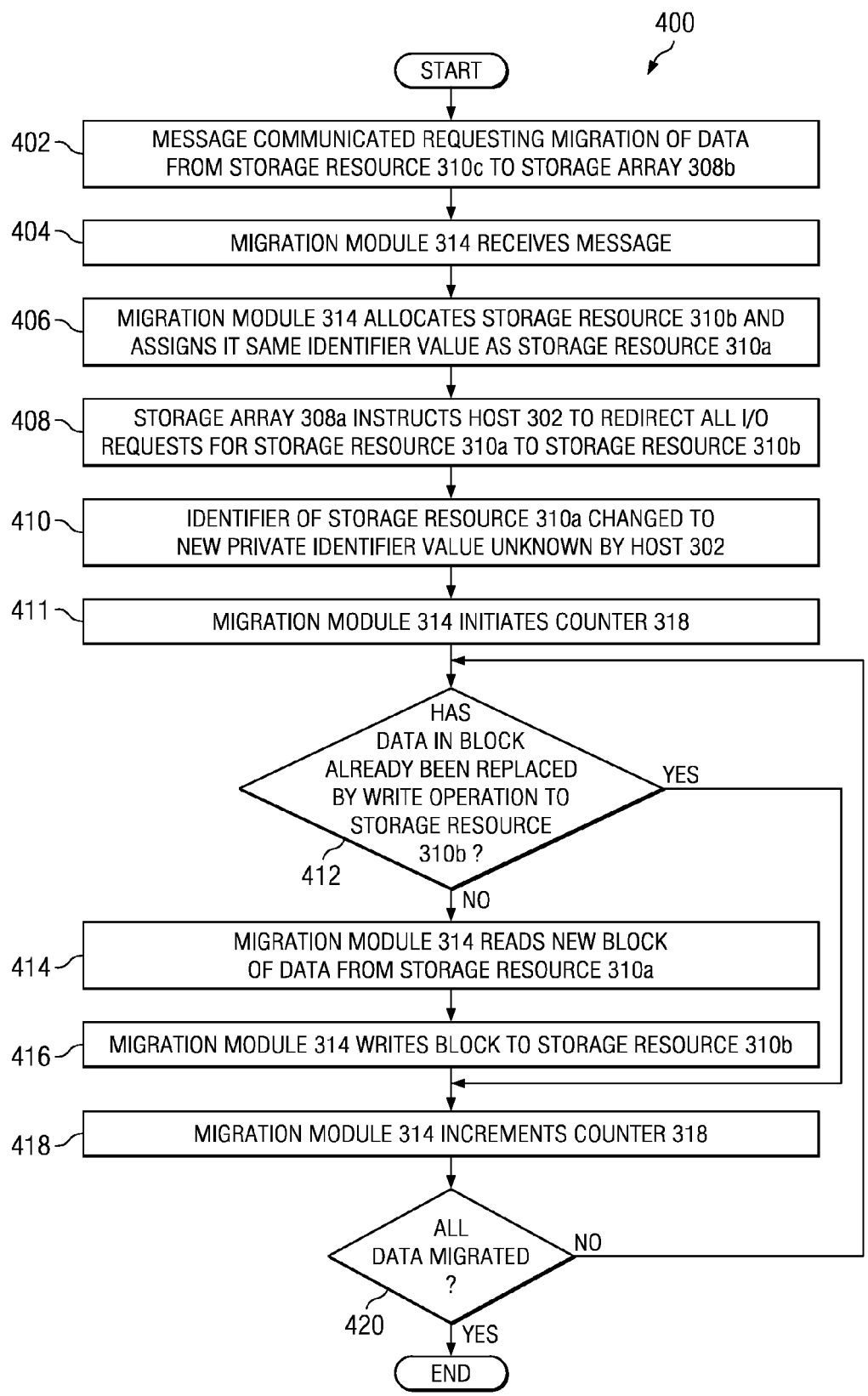
FIG. 4 illustrates a flow chart of an example method for migrating data, in accordance with certain embodiments of the present disclosure.

FIG. 4 illustrates a flow chart of an example method 400 for migrating data, in accordance with certain embodiments of the present disclosure. According to one embodiment, method 400 preferably begins at step 402. As noted above, teachings of the present disclosure may be implemented in a variety of configurations of system 300. As such, the preferred initialization point for method 400 and the order of the steps 402-420 comprising method 400 may depend on the implementation chosen.

At step 402, a message may be communicated requesting migration of data from source storage resource 310a to storage array 308b. For example, the message may be communicated as a result of a command issued by an administrator or user of system 300. In some embodiments, the message may be communicated from host 302 to storage array 308a or storage array 308b. In other embodiments, an administrator may issue the command from an information handling system or terminal other than host 302.

At step 404, migration module 314 of storage array 308b may receive the message from host 302.

At step 406, in response to receipt of the migration request message, storage array 308b may allocate storage resource 310b as the migration destination and assign it the same identifier value as source storage resource 310a (e.g, iSCSI qualified name or FibreChannel World Wide Name).

At step 408, storage array 308a may instruct host 302 to redirect all input/output requests for source storage resource 310a to destination storage resource 310b. For example, in SCSI embodiments, storage array 308a may respond to an input/output request from host 302 intended for source storage resource 310a by responding to host 302 with a REDIRECT message.

At step 410, storage array 308a or another suitable component of system 300 may change the identifier of source storage resource 310a to an identifier value unknown by host 302, but known to migration module 314 (e.g, iSCSI qualified name or FibreChannel World Wide Name).

At step 411, migration module 314 may initiate counter 318 (e.g., reset counter 318 or set it to zero).

At step 412, migration module 314 may determine whether data in a particular block of storage resource 310a has already been replaced by a write operation to destination storage resource 310b that has occurred during the migration process. For example, migration module 314 may determine the memory address of the data block and compare the memory address with bitmap 320 to determine whether the bitmap 320 entry corresponding with the memory address indicates that a write operation corresponding to the memory address has been performed. If the data in the block has already been replaced by a write operation, method 400 may proceed to step 418. Otherwise, if the data in the block has not been replaced by a write operation, method 400 may proceed to step 414.

At step 414, in response to a determination that the data block has not been replaced by a write operation, migration module 314 may read a block of data from storage resource 310a, by addressing source storage resource 310a with its new private identifier.

At step 416, migration module may write the block to destination storage resource 310b.

At step 418, in response to the data block written to destination storage resource 310b or in response to a determination that the data block has already been replaced by a write operation, migration module 314 may increment counter 318 to indicate the block has been written.

At step 420, migration module 314 may determine if all data associated with the migration has been migrated. For example, migration module 314 may compare the value present in counter 318 (e.g., indicating the number of data blocks migrated) to a value indicative of the amount of data to be migrated (e.g., the number of blocks present in source storage resource 310a). If not all data associated with the migration has migrated, method 400 may proceed again to step 412, where another block of data may be read from source storage resource 310a. If all data associated with the migration has been migrated, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order. In addition, steps 402-420 may be repeated, independently and/or collectively, as often as desired or required by a chosen implementation.

Method 400 may be implemented using system 300 or any other system operable to implement method 400. In certain embodiments, method 400 may be implemented partially or fully in software and/or firmware embodied in computer-readable media.

Figure 5:
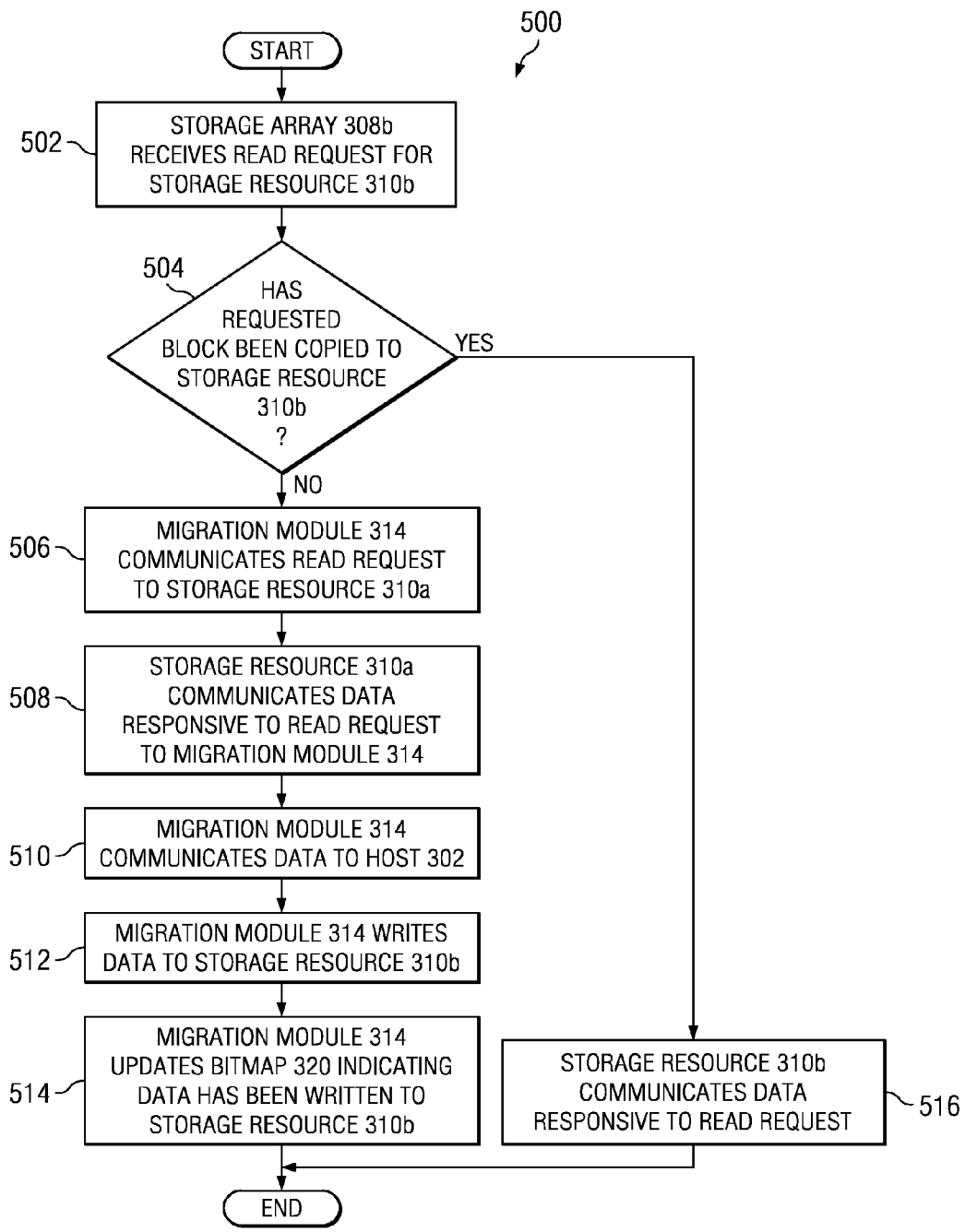
FIG. 5 illustrates a flow chart of an example method for performing a read request, in accordance with certain embodiments of the present disclosure.

FIG. 5 illustrates a flow chart of an example method 500 for performing a read request during migration of data, in accordance with certain embodiments of the present disclosure. According to one embodiment, method 500 preferably begins at step 502. As noted above, teachings of the present disclosure may be implemented in a variety of configurations of system 300. As such, the preferred initialization point for method 500 and the order of the steps 502-516 comprising method 500 may depend on the implementation chosen.

At step 502, storage array 308b may receive a read request (e.g., from host 302) for destination storage resource 310b while a migration operation (e.g., method 400) is taking place.

At step 504, in response to receiving the read request, migration module 314 may determine whether the data associated with the read request has already been migrated to destination storage resource 310b. For example, migration module 314 may compare the value present in counter 318 (e.g., indicating the number of data blocks migrated) to a value indicative of data associated with the read request (e.g., a block address associated with the read request), to determine whether the subject data has already been migrated. If the data associated with the read request has not been migrated to destination storage resource 310b, method 500 may proceed to step 506. Otherwise, if the data associated with the read request has been migrated to destination storage resource 310b, method 500 may proceed to step 516.

At step 506, in response to a determination that the data associated with the read request has not been migrated to destination storage resource 310b, migration module 314 may communicate the read request to source storage resource 310a using the private identifier of the source storage resource 310a.

At step 508, in response to the read request received from migration module 314, source storage resource 310a may communicate to migration module 314 the data responsive to the read request.

At step 510, migration module 314 may communicate (e.g., to host 302) data responsive to the read request.

At step 512, migration module 314 may write the data responsive to the read request to storage resource 310b. This step may reduce the number of data transfers over the network during migration, and future reads of the same data may be satisfied from storage resource 310b.

At step 514, migration module 314 may update bitmap 320 to indicate blocks of data that have been written to storage resource 310b. After completion of step 514, method 500 may end.

At step 516, in response to a determination that the data associated with the read request has been migrated to destination storage resource 310b, destination storage resource 310b may communicate (e.g., to host 302) the data responsive to the read request. After completion of step 516, method 500 may end.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order. In addition, steps 502-510 may be repeated, independently and/or collectively, as often as desired or required by a chosen implementation.

Method 500 may be implemented using system 300 or any other system operable to implement method 500. In certain embodiments, method 500 may be implemented partially or fully in software and/or firmware embodied in computer-readable media.

Figure 6:
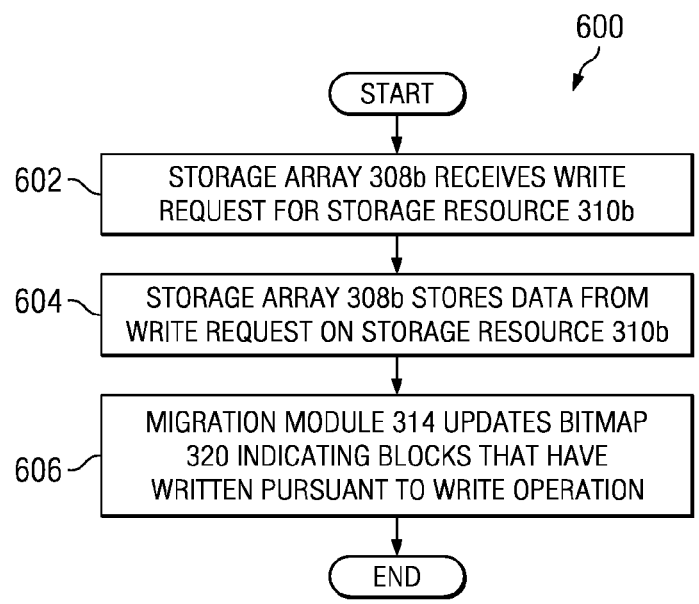
FIG. 6 illustrates a flow chart of an example method for performing a write request, in accordance with certain embodiments of the present disclosure.

FIG. 6 illustrates a flow chart of an example method 600 for performing a write request during migration of data, in accordance with certain embodiments of the present disclosure. According to one embodiment, method 600 preferably begins at step 602. As noted above, teachings of the present disclosure may be implemented in a variety of configurations of system 300. As such, the preferred initialization point for method 600 and the order of the steps 602-606 comprising method 600 may depend on the implementation chosen.

At step 602, storage array 308b may receive a write request (e.g., from host 302) for destination storage resource 310b while a migration operation (e.g., method 400) is taking place.

At step 604, in response to the write request, storage array 308b may store data associated with the write request on destination storage resource 310b.

At step 606, in response to the write request, migration module 314 may update bitmap 320 to indicate blocks of data that have been written pursuant to the write operation. After completion of step 606, method 600 may end.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order. In addition, steps 602-606 may be repeated, independently and/or collectively, as often as desired or required by a chosen implementation.

Method 600 may be implemented using system 300 or any other system operable to implement method 600. In certain embodiments, method 600 may be implemented partially or fully in software and/or firmware embodied in computer-readable media.

In the discussion of methods 400, 500 and 600 above, many references are made to "read requests," "read operations," "write requests," ad "write operations." For the purposes of this disclosure, such terms are used to broadly refer to any suitable read or write operation that may be issued or communicated in accordance with any suitable storage technique, protocol, and/or standard (e.g., Small Computer System Interface, Internet Small Computer System Interface, Fibre-Channel, etc.).

Using the methods and systems disclosed herein, problems associated with conventional approaches to data migration may be improved, reduced, or eliminated. For example, using the migration approaches set forth in this disclosure, migrated data and data stored pursuant to write operations may only be communicated over a network once, instead of twice as is the case with traditional approaches. In addition, host connections to a storage network are migrated automatically from the destination storage array and no reconfiguration of a host or network may be required to allow a host to access the destination storage resource.

Although the present disclosure has been described in detail, it should be understood that various changes, substitutions, and alterations can be made hereto without departing from the spirit and the scope of the disclosure as defined by the appended claims.

What is claimed is:

1. A method for migration of data, comprising:
    allocating a destination storage resource to receive migration data;
    instructing a host to redirect input/output requests issued to the source storage resource during data migration to the destination storage resource;
    assigning the destination storage resource a first identifier value equal to an identifier value associated with a source storage resource;
    assigning the source storage resource a second identifier value different than the first identifier value, the second identifier value unknown to the host; and
    migrating data from the source storage resource to the destination storage resource.

2. The method according to claim 1, wherein migrating data includes:
    determining whether a portion of the data stored on the source storage resource has been replaced by data written to the destination source resource in connection with an input/output request; and
    writing the portion of data to the second storage resource in response to a determination that the portion of data has not been replaced by data written to the destination source resource in connection with an input/output request.

3. The method according to claim 1, further comprising:
    in response to a read request to the destination resource during data migration to the destination storage resource, determining whether data associated with the read request has been migrated to destination storage resource;
    communicating the read request to the source storage resource in response to a determination that data associated with the read request has not been migrated to destination storage resource; and communicating data associated with the read request from the destination resource in response to a determination that data associated with the read request has been migrated to destination storage resource.

4. The method according to claim 1, further comprising updating a data structure in response to receiving an input/output to the destination storage resource during data migration to the destination storage resource, the data structure indicating portions of data that have been written to the destination storage resource in connection with input/output requests to the destination storage resource.

5. The method according to claim 4, wherein the data structure is a bitmap.

6. A system for migration of data, comprising:
a source storage resource;
a destination storage resource; and
a migration module configured to manage migration of data from the source storage resource to the destination storage resource and operable to, in response to a request to migrate data:
instruct a host to redirect input/output requests issued to the source storage resource during data migration to the destination storage resource;
assign the destination storage resource a first identifier value equal to an identifier value associated with the source storage resource;
assign the source storage resource a second identifier value different than the first identifier value, the second identifier value unknown to the host; and
migrate data from the source storage resource to the destination storage resource.

7. The system according to claim 6, the migration module further operable to:
determine whether a portion of the data stored on the source storage resource has been replaced by data written to the destination source resource in connection with an input/output request; and
migrate the portion of data to the second storage resource in response to a determination that the portion of data has not been replaced by data written to the destination source resource in connection with an input/output request.

8. The system according to claim 6, the migration module further operable to:
in response to a read request to the destination resource during data migration to the destination storage resource, determine whether data associated with the read request has been migrated to destination storage resource;
communicate the read request to the source storage resource in response to a determination that data associated with the read request has not been migrated to destination storage resource; and
communicate data associated with the read request from the destination resource in response to a determination that data associated with the read request has been migrated to destination storage resource.

9. The system according to claim 6, further comprising the migration module further operable to update a data structure in response to receiving an input/output request to the destination storage resource during data migration to the destination storage resource, the data structure indicating portions of data that have been written to the destination storage resource in connection with input/output requests to the destination storage resource.

10. The system according to claim 9, wherein the data structure is a bitmap.

11. A system for migration of data, comprising:
a source storage array comprising a source storage resource; and
a destination storage array configured to:
allocate a destination storage resource to receive migration data from the source storage resource;
instruct a host to redirect input/output requests issued to the source storage resource during data migration to the destination storage resource;
assign the destination storage resource a first identifier value equal to an identifier value associated with the source storage resource;
assign the source storage resource a second identifier value different than the first identifier value, the second identifier value unknown to the host; and
migrate data from the source storage resource to the destination storage resource.

12. The system according to claim 11, the source storage array further operable to redirect an input/output request issued to the source storage resource during data migration to the destination storage resource.

13. The system according to claim 11, the destination storage resource further operable to:
determine whether a portion of the data stored on the source storage resource has been replaced by data written to the destination source resource in connection with an input/output request; and
migrate the portion of data to the second storage resource in response to a determination that the portion of data has not been replaced by data written to the destination source resource in connection with an input/output request.

14. The system according to claim 11, the destination storage array further operable to:
in response to a read request to the destination resource during data migration to the destination storage resource, determine whether data associated with the read request has been migrated to destination storage resource;
communicate the read request to the source storage resource in response to a determination that data associated with the read request has not been migrated to destination storage resource; and
communicate data associated with the read request from the destination resource in response to a determination that data associated with the read request has been migrated to destination storage resource.

15. The system according to claim 11, further comprising the destination storage array further operable to update a data structure in response to receiving an input/output request to the destination storage resource during data migration to the destination storage resource, the data structure indicating portions of data that have been written to the destination storage resource in connection with input/output requests to the destination storage resource.

16. The system according to claim 15, wherein the data structure is a bitmap.

* * * * *